(12) United States Patent
Cobbett et al.

(10) Patent No.: US 12,018,695 B2
(45) Date of Patent: Jun. 25, 2024

(54) OIL FEED NUT AND OIL RESERVOIR FOR A VACUUM PUMP

(71) Applicant: Edwards Limited, Burgess Hill (GB)

(72) Inventors: Andrew Cobbett, Burgess Hill (GB); Keith Weston, Burgess Hill (GB); Richard Glyn Horler, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 0 days.

(21) Appl. No.: 18/250,435

(22) PCT Filed: Oct. 28, 2021

(86) PCT No.: PCT/GB2021/052798
§ 371 (c)(1),
(2) Date: Apr. 25, 2023

(87) PCT Pub. No.: WO2022/090720
PCT Pub. Date: May 5, 2022

(65) Prior Publication Data
US 2023/0400035 A1    Dec. 14, 2023

(30) Foreign Application Priority Data

Nov. 2, 2020  (GB) .................................... 2017309

(51) Int. Cl.
*F04D 29/063*  (2006.01)
*F04D 19/04*   (2006.01)
*F16C 33/66*   (2006.01)

(52) U.S. Cl.
CPC ......... *F04D 29/063* (2013.01); *F04D 19/042* (2013.01); *F04D 19/048* (2013.01); *F16C 33/664* (2013.01)

(58) Field of Classification Search
CPC ... F16N 7/12; F16N 7/36; F16N 7/363; F16N 7/366; F04D 19/04; F04D 19/042; F04D 19/044; F04D 19/046; F16C 2360/45
See application file for complete search history.

(56) References Cited

U.S. PATENT DOCUMENTS

| 4,641,978 A | 2/1987 | Kapich |
| 10,400,777 B2 | 9/2019 | Rudge et al. |
| 2019/0383300 A1 | 12/2019 | Manabe et al. |

FOREIGN PATENT DOCUMENTS

| DE | 19729450 A1 | 2/1999 |
| EP | 3575610 A1 | 12/2019 |

(Continued)

OTHER PUBLICATIONS

Merged EP 357610 A1 (Year: 2019).*

(Continued)

*Primary Examiner* — Juan G Flores
*Assistant Examiner* — Ryan C Clark
(74) *Attorney, Agent, or Firm* — Theodore M. Magee; Westman, Champlin & Koehler, P.A.

(57) ABSTRACT

Oil feed nut for providing a lubricant to a bearing of a vacuum pump comprising a first end and an opposite second end and being configured to be connected to a shaft of the vacuum pump. Further, the oil feed nut comprising an oil feeding element extending between the first end and the second end, wherein the oil feeding element has an increasing diameter towards the second end to create an increasing rotational force acting on the lubricant in order to convey the lubricant towards the second end, and a bearing journal element having a cylindrical surface configured to be received in a back-up bearing of the vacuum pump. Therein, the back-up bearing is arranged in a cartridge of an oil reservoir.

7 Claims, 3 Drawing Sheets

(56) References Cited

FOREIGN PATENT DOCUMENTS

| JP | 2019210931 | A  | 12/2019 |
|----|------------|----|---------|
| WO | 2016128712 | A1 | 8/2016  |
| WO | 2018025023 | A1 | 2/2018  |

OTHER PUBLICATIONS

Merged GB 2562493 A (Year: 2018).*
British Examination Report dated Jun. 9, 2021 and Search Report dated Jun. 8, 2021 for corresponding British Application No. GB2017309.2, 7 pages.
PCT Notification of Transmittal of the International Search Report and the Written Opinion of the International Searching Authority, or the Declaration and PCT Search Report dated Jan. 26, 2022 for corresponding PCT application Serial No. PCT/GB2021/052798, 5 pages.
PCT Written Opinion dated Jan. 26, 2022 for corresponding PCT application Serial No. PCT/GB2021/052798, 6 pages.
Response to Written Opinion dated Aug. 30, 2022 for corresponding PCT application Serial No. PCT/GB2021/052798, 2 pages.
British Examination Report dated Mar. 23, 2021 and Search Report dated Mar. 22, 2021 for corresponding British Application No. GB2017309.2, 7 pages.
British Examination Report dated Jan. 13, 2023 for corresponding British Application No. GB2017309.2, 4 pages.

* cited by examiner

OIL FEED NUT AND OIL RESERVOIR FOR A VACUUM PUMP

CROSS-REFERENCE OF RELATED APPLICATION

This application is a Section 371 National Stage Application of International Application No. PCT/GB2021/052798, filed Oct. 28, 2021, and published as WO 2022/090720A1 on May 5, 2022, the content of which is hereby incorporated by reference in its entirety and which claims priority of British Application No. 2017309.2, filed Nov. 2, 2020.

FIELD

The present invention relates to an oil feed nut providing a lubricant to a bearing of a vacuum pump, an oil reservoir containing and providing the lubricant, a kit with such an oil feed nut and an oil reservoir to be retrofitted to an existing vacuum pump and a vacuum pump having such an oil feed nut and oil reservoir.

BACKGROUND

Existing vacuum pumps and in particular turbomolecular pumps comprise a housing with an inlet and an outlet. Within the housing a rotor shaft is rotatably disposed having at least one pump element interacting with at least one stator element. The rotor shaft is rotated by an electromotor and due to interaction of the least one pump element with the at least one stator element a gaseous medium is conveyed from the inlet of the vacuum pump to the outlet. In order to be rotatable, the rotor shaft is supported by one or more bearings which can be roller bearings such as ball bearings and the like.

In operation a lubricant must be delivered to the roller bearings in order to reduce wear-out and fatigue of the roller bearing. Usually, the lubricant is contained in an oil reservoir and delivered from there to the roller bearing by an oil feed nut. Therein, the oil reservoir needs to be replaced from time to time during maintenance of the vacuum pump in order to provide proper function and ensuring sufficient delivery of lubricant to the roller bearing.

Due to fast rotation of the rotor shaft in the case of a malfunction of the vacuum pump, the rotor shaft and in particular the pump element may crush into the stator causing severe damage and even destruction of the vacuum pump and may further have even the risk of injury of the operating personnel. Thus, it is desirable to have a back-up bearing in the vacuum pump in order to support the rotor shaft in case of malfunction and avoid a crush of the rotor and the housing or the stator elements. However, there are difficulties to place both, the back-up bearing and the oil reservoir with the oil feed nut. Due to the necessity of the lubrication of the roller bearing, often a back-up bearing is omitted. In particular, for an existing vacuum pump without a back-up bearing there is currently almost no possibility to retrofit a back-up bearing in order to enhance safety of operation of this vacuum pump.

Thus, it is an object of the present invention to provide the possibility having an oil feed nut and a back-up bearing together and further providing the possibility to retrofit existing vacuum pump with such a back-up bearing without extensive intrusion to the vacuum pump.

The above given problem is solved by the present invention by an oil feed nut according to claim 1, an oil reservoir according to claim 6, a kit according to claim 8 comprising such an oil feed nut and such an oil reservoir, and a vacuum pump according to claim 9.

The discussion above is merely provided for general background information and is not intended to be used as an aid in determining the scope of the claimed subject matter. The claimed subject matter is not limited to implementations that solve any or all disadvantages noted in the background.

SUMMARY

In a first aspect of the present invention an oil feed nut is provided for providing a lubricant to a bearing of a vacuum pump. The oil feed nut comprising a first end and an opposite second end and is configured to be connected to a rotor shaft of the vacuum pump. In particular, the oil feed nut is releasably connectable to the rotor shaft of the vacuum pump. Further, the oil feed nut comprises an oil feeding element extending in an axial direction between the first end and the second end of the oil feed nut, wherein the oil feeding element has an increasing diameter towards the second end in order to be cone shaped. By the increasing diameter an increasing rotational force is acting on the lubricant on the surface of the feeding element thereby conveying the lubricant towards to the second end and from the second end to the bearing of the vacuum pump arranged close to the second end of the oil feed nut. In accordance to the present invention the oil feed nut comprises a bearing journal element having a cylindrical surface and being configured to be received in a back-up bearing of the vacuum pump. Thus, by the present invention the oil feed nut provides two functionalities combinedly, i.e. delivering the lubricant from an oil reservoir to the bearing by the oil feeding element and further providing a bearing journal element interacting with the back-up bearing of the vacuum pump in order to support the rotor shaft of the vacuum pump in case of malfunction of the vacuum pump. Thus, these functionalities are integrated into one piece, which is easy to manufacture and can be retrofitted to existing vacuum pumps.

Preferably, the bearing journal element and the oil feeding element are integrally built as one piece. Even more preferably, the oil feed nut is built as one piece.

The bearing journal element is arranged at the first end of the oil feed nut and the oil feeding element is arranged at the second end. More particular, the bearing journal element is directly next to the oil feeding element.

Preferably, the oil feed nut comprises a connecting element to be connected to a rotor shaft of a vacuum pump. Thus, by the connecting element connecting of the oil feed nut to the rotor shaft of the vacuum pump is facilitated. In particular the connecting element releasably connects the oil feed nut to the rotor shaft. In both cases the connecting element might be provided by a threaded connection, shrink fitting, clamping or the like.

Preferably, the connecting element is arranged at the second end. Alternatively, the oil feed nut comprises a through hole extending through the oil feed nut from the first end to the second end and being configured to receive a part of the rotor shaft of the vacuum pump wherein the connecting element is arranged at the first end and with the connecting element at the first, the oil feed nut is connectable to the rotor shaft. Due to the through hole, the oil feed nut is surrounding the rotor shaft improving concentricity of the rotor shaft and the oil feed nut.

In a second aspect of the present invention, an oil reservoir is provided to be connected to a housing of a vacuum pump. The oil reservoir comprises a cartridge containing a lubricant to be provided to a bearing of the vacuum pump. In particular, the cartridge contains a porous or fibrous material for containing and storing the lubricant. A feeding tip is connected to the cartridge and particular to the material in the cartridge, wherein the feeding tip is also made of a fibrous or porous material and configured to be in contact with an oil feed nut of the vacuum pump. Due to the material the lubricant is conveyed to the end of the tip and from there to the surface of the oil feed nut due to capillary forces and provided by the oil feed nut to the bearing of the vacuum pump. Further, in accordance with the present invention, in the cartridge a back-up bearing is arranged, wherein the back-up bearing is configured to receive a bearing journal element of the vacuum pump. Thus, the oil reservoir provides two functionalities combinedly, i.e. containing and delivering a lubricant to an oil feed nut and further providing a back-up bearing interacting in particular with the rotor shaft of the vacuum pump in case of malfunction.

Preferably, the back-up bearing is built as roller bearing, such as ball bearing, or friction bearing or the like.

Preferably, the oil reservoir is releasably connectable to the vacuum pump. Thus, the oil reservoir can be replaced during maintenance of the vacuum pump in order to ensure a sufficient amount of lubricant in the oil reservoir and sufficient contact between the feeding tip and the oil feed nut of the vacuum pump.

Preferably, the oil reservoir is further developed along with the invention as filed under EP3256733 and EP3494308.

A third aspect of the present invention a kit is provided comprising an oil feed nut as previously described and an oil reservoir as previously described to be retrofitted to an existing vacuum pump. In particular, the bearing journal element provided by the oil feed nut is interacting with the backup bearing placed in the cartridge of the oil reservoir. Thus, due to the kit according to the present invention the oil feed nut and the oil reservoir can be retrofitted to existing vacuum pumps during maintenance without extensive intrusion to the vacuum pump. Retrofitting the present invention to an existing vacuum pump includes the steps of:
1. removing the existing oil reservoir,
2. removing the existing oil feed nut from the vacuum pump,
3. installing the oil feed nut according to the present invention, and
4. assembly of the oil reservoir according to the present invention.

Thereby the back-up bearing is employed in the existing vacuum pump supporting the rotor shaft in case of malfunction of the vacuum pump and avoiding crash of the rotating elements inside the vacuum pump which would otherwise lead to severe damage and even destruction of the vacuum pump.

In a fourth aspect of the present invention, a vacuum pump is provided, in particular a turbomolecular pump, comprising a housing. A rotor shaft is disposed in the housing having at least one pump element, wherein the rotor shaft is rotatably supported by one or more bearings. Therein, at least one bearing is built as roller bearing such as ball bearing or the like. Further, the vacuum pump comprises an oil reservoir as previously described, preferably releasably connected to the housing and containing the lubricant to be provided to the at least one roller bearing. Further, an oil feed nut is connected to the rotor shaft. Therein, preferably the oil feed nut is connected to one end of the rotor shaft. The oil feed nut comprises an oil feeding element extending in an axial direction between a first and a second end of the oil feed nut. Therein, the oil feeding element has an increasing diameter towards the second end to be cone shaped to create an increasing rotational force acting on the lubricant in order to convey the lubricant towards the second end. Preferably, the second end is arranged at the position of the roller bearing, i.e. at least a part of the roller bearing is surrounding the second end of the oil feeding nut. Lubricant is centrifuged from the second end towards the roller bearing of the vacuum pump, providing the lubricant for proper operation of the roller bearing. Further, according to the present invention, a bearing journal element is provided being connected to the oil feed nut having a cylindrical surface configured to be received in the back-up bearing placed in the cartridge of the oil reservoir. Thus, the oil feed nut provides the bearing journal element for the back-up bearing. Alternatively, the bearing journal element is directly connected to the rotor shaft having also a cylindrical face configured to be received in the back-up bearing of the oil reservoir. Preferably, the bearing journal element is integrally formed by the rotor shaft being one piece. Thus, the rotor shaft itself comprises the bearing journal interacting with the back-up bearing of the oil reservoir.

Preferably the oil feed nut has a through hole extending through the oil feed nut from the first end to the second end configured to receive at least a part of the rotor shaft of the vacuum pump. Thus, the rotor shaft is extending through the oil feed nut. The bearing journal element is preferably arranged at the first end of the oil feed nut to be able to interact with the back up bearing of the oil reservoir.

Preferably, the oil feed nut may be built according to the features as described above.

Preferably, the rotor shaft comprises a first end towards an outlet of the vacuum pump and an opposite second end towards the inlet of the vacuum pump wherein the oil feed nut is connected to the first end of the rotor shaft. Therein, the oil feed nut can be connected to the rotor shaft at the first end or directly to the first end of the rotor shaft being in direct contact with the first end of the rotor shaft.

Preferably, the oil reservoir surrounds the first end of the rotor shaft. Thereby, the oil reservoir can interact with the oil feed nut connected to the first end of the rotor shaft while the bearing journal element can interact with the back-up bearing of the oil reservoir.

Preferably, the cylindrical surface of the bearing journal element has a diameter smaller than the inner diameter of the back-up bearing such that during normal operation of the vacuum pump the cylindrical surface of the bearing journal element is not in contact with the back-up bearing. Only in case of malfunction of the vacuum pump the cylindrical surface of the bearing journal element comes into contact with the bearing to provide support for the rotor shaft.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

In the following the present invention is described in more detail with reference to the accompanied drawings.
It is shown.

DETAILED DESCRIPTION

Figure 1:
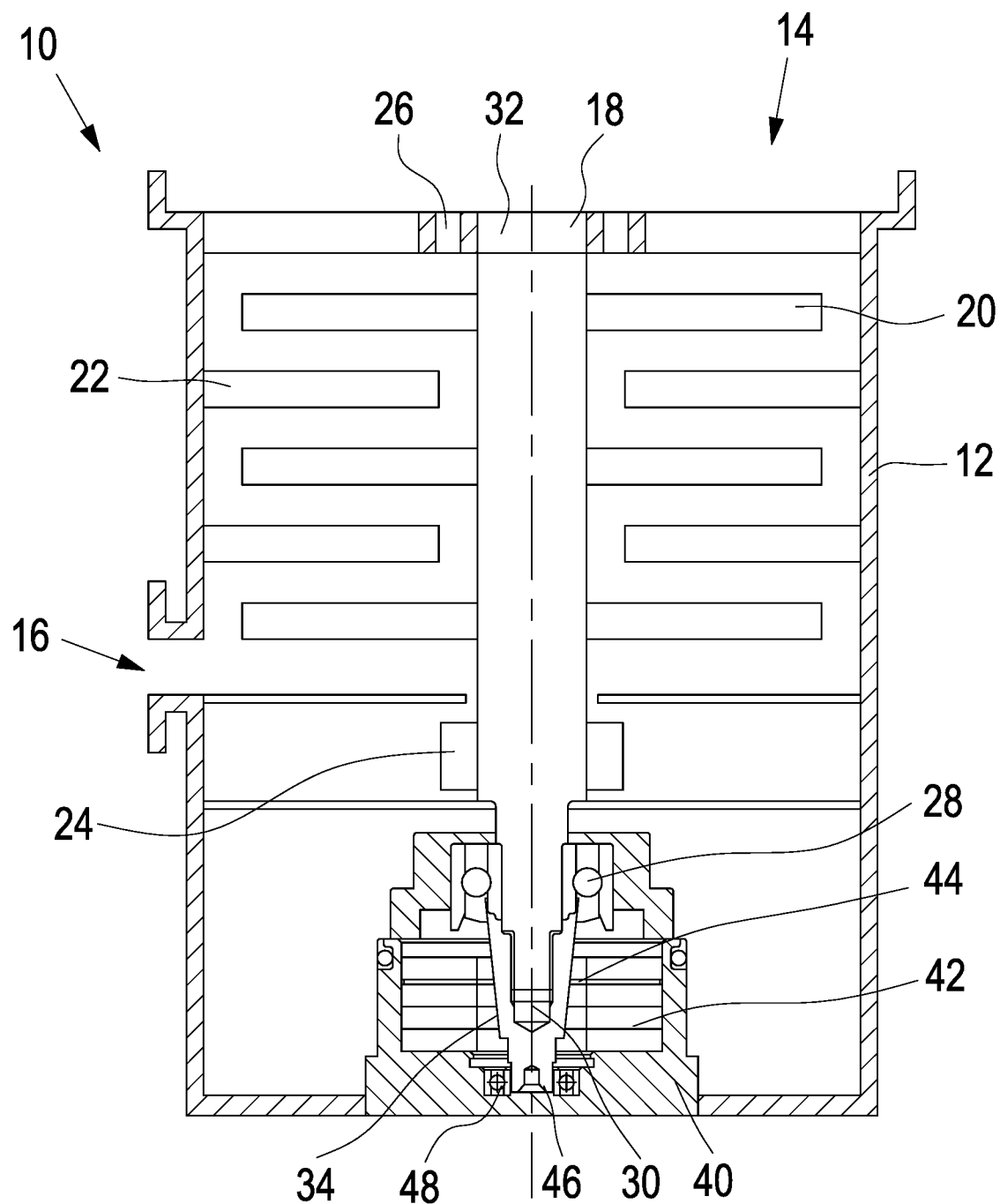
FIG. 1 a vacuum pump according to the present invention FIG. 2 a detailed view of the oil feed nut according to the present invention and FIG. 3 a second embodiment of the oil feed nut according to the present invention.

The vacuum pump 10 comprises a housing 12 having an inlet 14 and an outlet 16. In the housing 12 a rotor shaft 18 is disposed having one or more pump elements 20 interacting with stator elements 22 of the housing 12. In the example of FIG. 1, the vacuum pump 10 is a turbomolecular vacuum pump wherein the pump elements 20 are built by vanes interacting with vanes of the stator elements 22. The rotor 18 is rotated by an electro motor 24 and due to rotation of the rotor shaft 18, a gaseous medium is conveyed from the inlet 14 to the outlet 16. Therein, the rotor 18 is rotatably supported by a first bearing 26 built as a magnetic bearing at the side of the inlet 14 of the vacuum pump 10. A second bearing supporting the rotor shaft 18 is built as ball bearing 28 at the outlet side of the rotor shaft at a first end 30 of the rotor shaft 18 opposite to a second end 32 of the rotor shaft 18.

Figure 2:
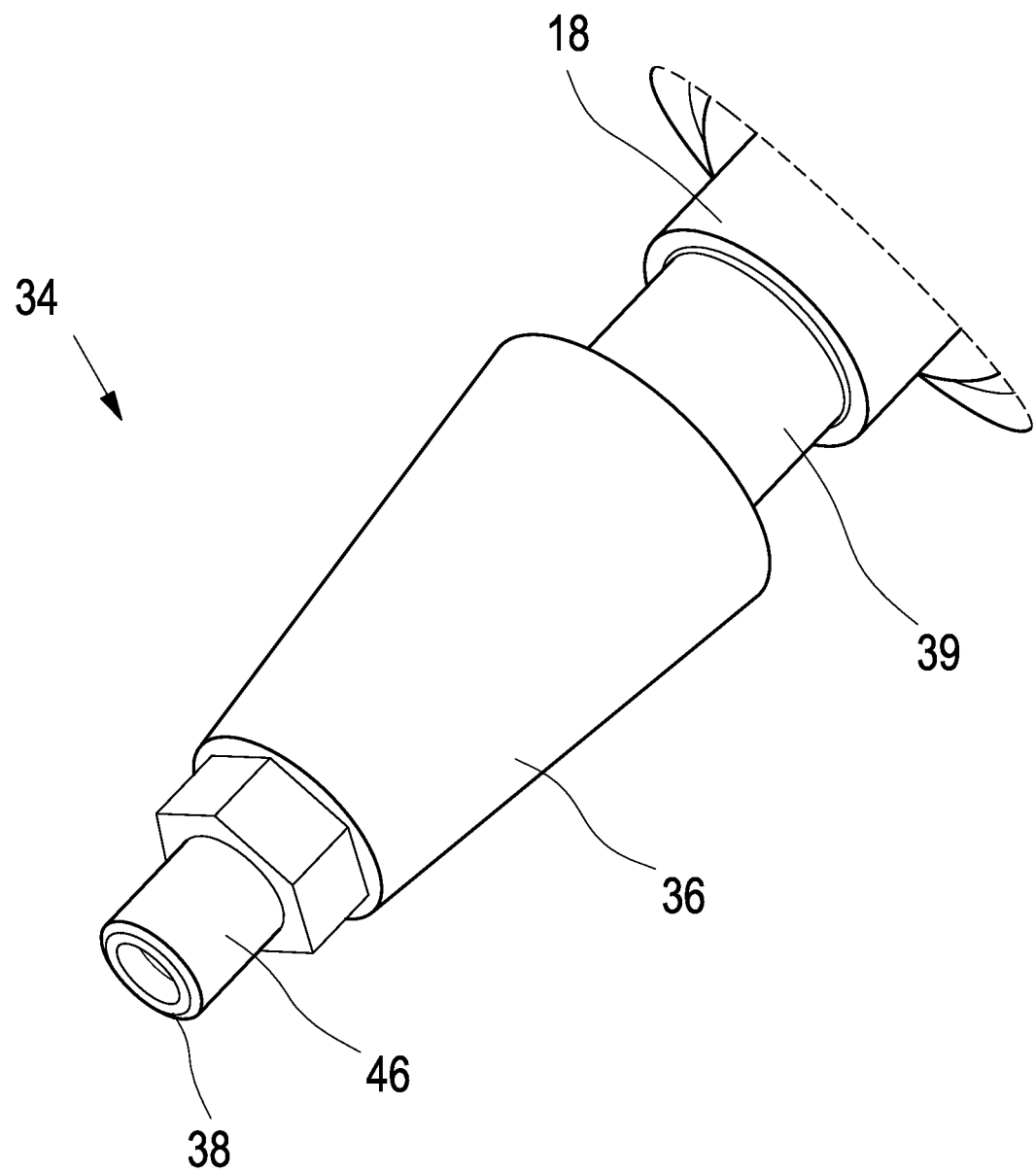

To the first end 30 of the rotor shaft 18 an oil feed nut 34 is connected shown in more detail in FIG. 2 having a first end 38 and an opposite second end 39. Therein, the oil feed nut 34 comprising an oil feeding element 36 having an outer surface with an increasing towards a second end 39 of the oil feeding element 34. Thus, the oil feeding element 36 having a cone shaped outer surface. Further, the oil feed nut 34 is at least partly surrounded by an oil reservoir 40 which is releasably connected to the housing 12 of the vacuum pump. In particular, the oil reservoir 40 is inserted into a recess of the housing 12 in order to provide easy access to the oil reservoir 40 during maintenance of the vacuum pump. The oil reservoir 40 comprises a cartridge 42 containing and storing a lubricant to be provided to the ball bearings 28. Therein, the cartridge 42 can be filled with a fibrous or porous material to store the lubricant. To this material a feeding tip 44 is connected which is in contact with the conical surface of the oil feeding element 36 of the oil feed nut 34. Preferably, also the feeding tip is made from a fibrous or porous material drawing a lubricant from the cartridge 42 via capillary force and applying the lubricant onto the surface of the oil feeding element 36 of the oil feed nut. The oil feed nut 34 is rotated in conjunction with the rotor shaft 18. Due to rotation of the oil feeding nut by the shaft 18 of the vacuum pump the lubricant is conveyed by the centrifugal force towards the ball bearing 28, wherein the second end of the oil feeding nut 34 is within or in the range of the ball bearing 28. Thus, the lubricant is conveyed from the feeding tip 44 via the oil feeding element 36 to the second end of the oil feeding element 34 and dripping from there to the ball bearing 28 of the vacuum pump 10.

Further, as shown in FIG. 2, the oil feeding nut 34 further comprises a bearing journal element 46 having a cylindrical outer surface. The bearing journal element 46 is interacting with a back-up bearing 48 disposed in the cartridge 42 of the oil reservoir 40. Therein, the back-up bearing 48 can be built as ball bearing, friction bearing or the like. Therein, in normal operation of the vacuum pump the bearing journal element 46 of the oil feed nut 34 does not come into contact with the back-up bearing 48 due to a smaller diameter of the bearing journal 46 than the inner diameter of the back-up bearing 48. In case of malfunction of the vacuum pump the bearing journal element 46 comes into contact with the back-up bearing 48 and provides minimum support of the rotor shaft 18.

Since the back-up bearing 48 is implemented in the oil reservoir 40 which is a replaceable part and can be replaced during maintenance, it is also possible to retrofit a back-up bearing to existing vacuum pumps. Therefore, in a first step the old oil reservoir is removed. Second, the old oil feed nut is also removed. Third, a new oil feed nut as shown for example in FIG. 2 having a bearing journal element 46 is installed on the first end 30 of the rotor shaft 18. Fourth, an oil reservoir according to the present invention is installed including the back-up bearing 48 interacting with the bearing journal element 46 of the oil feed nut 34.

Figure 3:
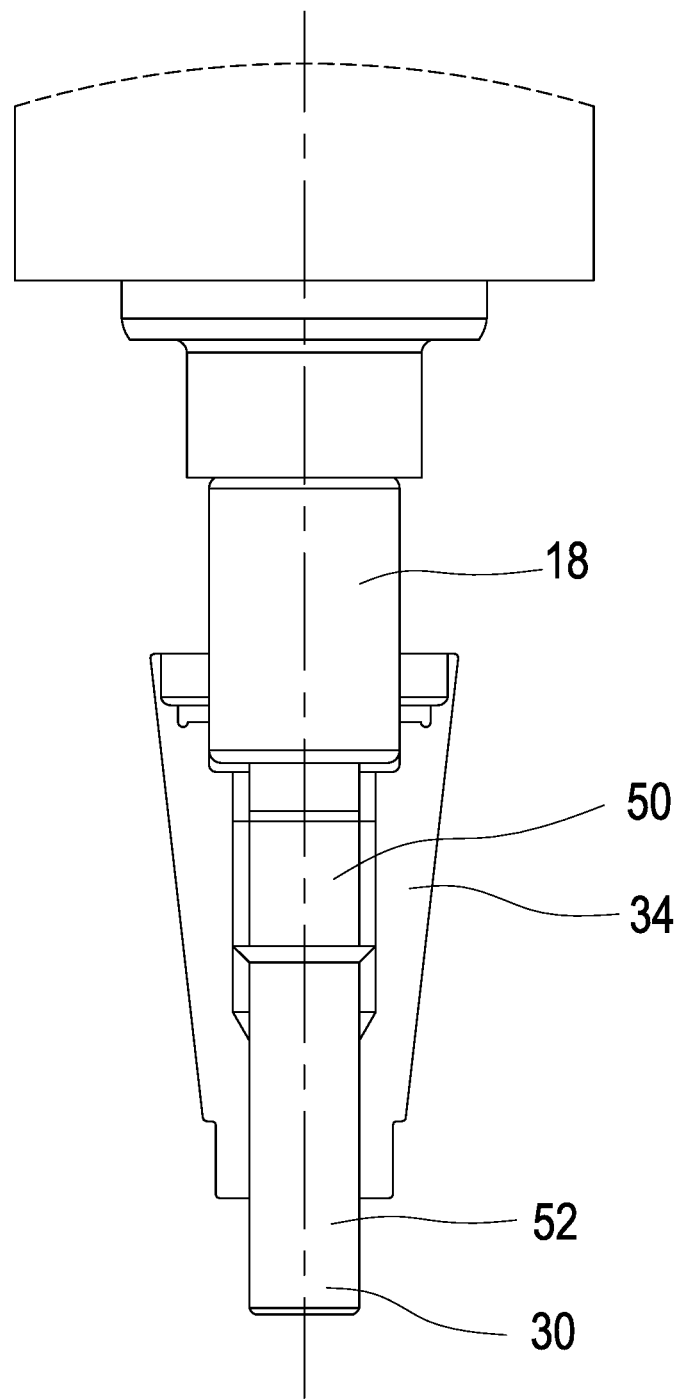

FIG. 3 shows another embodiment, wherein same or similar elements are indicated by identical reference signs. Therein, the oil feed nut 34 comprises a though hole 50 extending through the oil feed nut 34. The through hole 50 is configured to receive a part of the rotor shaft 18 such that the first end 30 of the rotor shaft 18 is extending through the oil feed nut 34 and providing the bearing journal element 52. Thus, the back-up bearing interacting with bearing journal element provided by the rotor shaft 18 itself for ease of concentricity.

Thus, by the present invention a combined system is provided, providing a lubricant to a ball bearing of the vacuum pump and further providing a back-up bearing avoiding severe damage and even destruction of the vacuum pump. Further, by the kit including the oil feed nut according to the present invention and the oil reservoir according to the present invention it is easily possible to retrofit existing vacuum pumps in order to provide increased safety by the back-up bearing.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An oil reservoir configured to be connected to a housing of a vacuum pump, comprising:
   a cartridge containing a lubricant to be provided to a bearing of the vacuum pump,
   a feeding tip to be in contact with an oil feed nut of the vacuum pump to apply the lubricant onto a surface of the oil feed nut, and
   a back-up bearing arranged in the cartridge configured to receive a bearing journal element of the vacuum pump.

2. The oil reservoir according to claim 1, characterized as being releasably connected to the vacuum pump.

3. A vacuum pump, comprising:
   a housing,
   a rotor shaft disposed in the housing,
   the oil reservoir according to claim 1 connected to the housing,
   wherein the oil feed nut is connected to the rotor shaft comprising an oil feeding element extending between a first end and a second end of the oil feed nut, wherein the oil feeding element has an increasing diameter towards the second end to create an increasing rotational force acting on the lubricant in order to convey the lubricant towards the second end, and the bearing journal element being connected to the oil feed nut or the rotor shaft having a cylindrical surface configured to be received in the back-up bearing of the oil reservoir.

4. The vacuum pump according to claim 3, characterized in that the rotor shaft comprises a first end towards an outlet of the vacuum pump and an opposite second end towards an inlet of the vacuum pump, wherein the oil feed nut is connected to the first end of the rotor shaft.

5. The vacuum pump according to claim 4, characterized in that the oil reservoir surrounds the first end of the rotor shaft.

6. The vacuum pump according to claim 3, characterized in that the cylindrical surface of the bearing journal element having a smaller diameter than an inner diameter of the back-up bearing such that in normal operation of the vacuum pump, the cylindrical surface is not in contact with the back-up bearing.

7. A kit comprising:
 an oil feed nut comprising:
  a first end and an opposite second end and being configured to be connected to a shaft of a vacuum pump,
  an oil feeding element extending between the first end and the second end, wherein the oil feeding element has an increasing diameter towards the second end to create an increasing rotational force acting on a lubricant in order to convey the lubricant towards the second end; and
  a bearing journal element having a cylindrical surface configured to be received in a back-up bearing of the vacuum pump, wherein the bearing journal element is arranged at the first end and the oil feeding element is arranged at the second end; and
 an oil reservoir configured to be retrofitted to the vacuum pump, the oil reservoir comprising:
  a cartridge containing the lubricant to be provided to a bearing of the vacuum pump,
  a feeding tip to be in contact with the oil feed nut of the vacuum pump to apply the lubricant onto a surface of the oil feed nut, and
  the back-up bearing arranged in the cartridge configured to receive the bearing journal element of the oil feed nut.

* * * * *